United States Patent [19]

Fett

[11] 4,084,750
[45] Apr. 18, 1978

[54] NOZZLE ASSEMBLY FOR FILTERS

[75] Inventor: Richard H. G. Fett, Poughkeepsie, N.Y.

[73] Assignee: The De Laval Separator Company, Poughkeepsie, N.Y.

[21] Appl. No.: 517,235

[22] Filed: Oct. 23, 1974

[51] Int. Cl.² ............................................. B01D 35/02
[52] U.S. Cl. ....................................... 239/600; 85/84; 210/293
[58] Field of Search ............... 239/547, 600, 542, 271, 239/272; 210/291, 293, 232; 85/84

[56] References Cited

U.S. PATENT DOCUMENTS

| | | | |
|---|---|---|---|
| 1,804,742 | 5/1931 | Campbell | 239/547 |
| 2,628,865 | 2/1953 | Duncan, Jr. | 239/547 X |
| 2,785,726 | 3/1957 | Brush | 85/84 |
| 3,361,363 | 1/1968 | Babington | 239/547 X |
| 3,393,599 | 7/1968 | Fisher | 85/84 X |
| 3,403,958 | 10/1968 | Gross | 85/84 X |
| 3,438,686 | 4/1969 | Stone | 85/84 X |
| 3,498,462 | 3/1970 | Larrowe et al. | 210/293 X |
| 3,797,755 | 3/1974 | Saisho | 239/547 |

Primary Examiner—John J. Love
Assistant Examiner—Michael Mar
Attorney, Agent, or Firm—Cyrus S. Hapgood

[57] ABSTRACT

A nozzle holder has a deformable end portion adapted to be passed through a hole in a distribution plate of an up-flow filter, whereby this end portion lies below the lower side of the plate. A nozzle extending through the holder engages the deformable end portion internally to maintain it in expanded condition and thereby prevent it from being withdrawn upward through the hole, and clamping means coacting with the holder at the upper side of the plate serve to clamp the expanded end portion of the holder against the lower side of the plate. This arrangement enables the nozzle to be installed entirely from above the plate.

7 Claims, 7 Drawing Figures

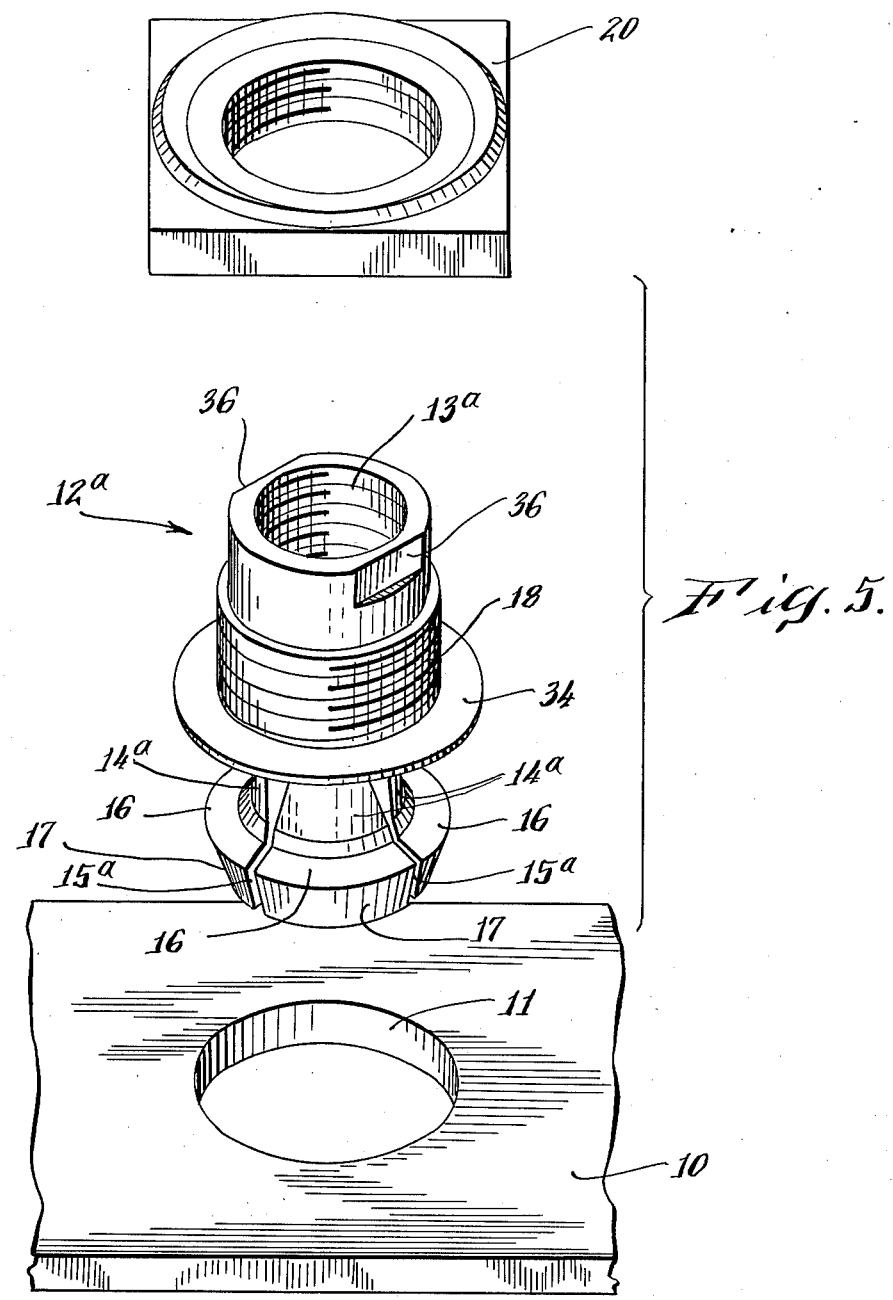

NOZZLE ASSEMBLY FOR FILTERS

This invention relates to nozzle assemblies such as those applied to the distribution plate of a so-called "up-flow" sand filter. More particularly, the invention relates to an improved nozzle assembly which can be installed in the distribution plate, or the like, more readily than prior assemblies of this type.

For illustrative purposes, the invention will be described with reference to an "up-flow" sand filter, although it will be understood that the new nozzle assembly is also useful in connection with other types of apparatus.

Filters of the above-mentioned type include a plurality of nozzle assemblies mounted in a so-called distribution plate which divides the filter housing into lower and upper chambers. The liquid to be filtered is forced upwardly from the lower chamber through the nozzles in the distribution plate and thence through the sand in the upper chamber.

According to common practice, each nozzle assembly is installed by first securing a nozzle holder in an opening in the distribution plate and then screwing a nozzle into a vertical passage extending through the holder. However, the installation of nozzle assemblies as made heretofore requires two persons, one working at the top of the nozzle plate and the other working from below. This is because securing of the nozzle holder in the plate opening requires application of a nut on an externally threaded part of the holder which protrudes below the plate.

The principal object of the present invention is to provide a nozzle assembly which can be installed by a single person from above the distribution plate.

According to the invention, the nozzle holder is provided with a deformable lower end portion which, when contracted, can be advanced through the plate hole to the lower side of the plate. A nozzle extending through the holder engages this lower end portion internally to maintain it in expanded condition and thereby prevent it from being withdrawn upward through the hole, and means coacting with the holder at the upper side of the plate serve to clamp the expanded end portion of the holder against the lower side of the plate.

In the preferred form of the new assembly, both the nozzle holder and the nozzle are made of a plastic material such as polypropylene, and the nozzle is threaded in the holder and adjustable lengthwise therein, the clamping means being a nut threaded on the holder and tightened against the upper side of the plate.

The deformable end portion of the nozzle holder may be formed by longitudinally slotting this end portion at spaced intervals around its passage through which the nozzle extends, thereby forming a plurality of flexible elements which are held away from each other by the nozzle to maintain this end portion in its expanded condition. Preferably, the holder is fabricated so that these flexible elements are normally contracted toward each other to provide the lower end portion of the holder with a diameter which allows it to be passed freely through the plate hole, the flexible elements being displaced away from each other by the nozzle when it is inserted through the holder.

These and other features of the invention will be better understood by reference to the following description in conjunction with the accompanying drawings, in which:

FIG. 5 is an exploded view of a preferred form of the nozzle holder;

Figure 4:
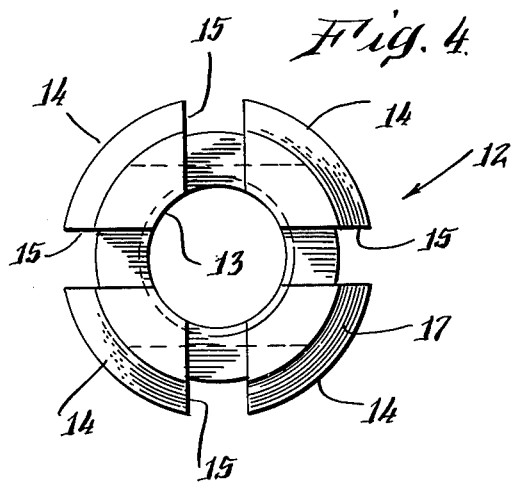
FIG. 4 is a lower end view of the nozzle holder shown in FIG. 1.
Figure 1:
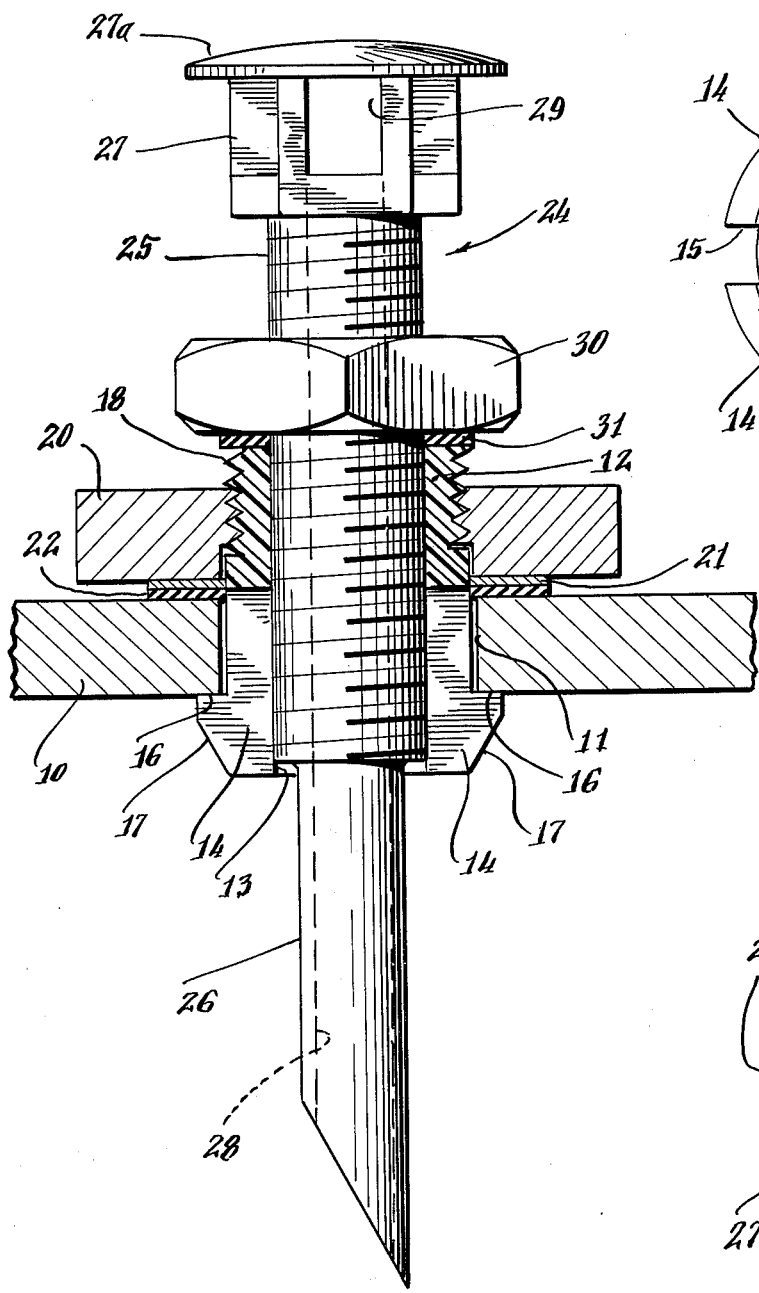
FIG. 1 is a vertical sectional view, partly in elevation, of one form of the new nozzle assembly applied to the distribution plate of an up-flow filter.

Referring to FIG. 1, the distribution plate for receiving the various nozzle assemblies is shown at 10. Each nozzle assembly comprises a holder 12 extending through a hole 11 in the distribution plate. The holder 12 is in the form of a sleeve which is internally threaded, as shown at 13, and which has an expansible lower end portion comprising a plurality of flexible elements 14. As shown in FIGS. 4 and 5, the flexible elements 14 are formed by providing the lower end portion of the holder with a plurality of vertical slots 15 at spaced intervals around the passage 13. Although the holder is shown in FIG. 4 with four slots 15, thereby providing four flexible elements 14, it will be understood that the number of the slots 15 and elements 14 may be varied and still provide an expansible lower end portion of the holder.

Each flexible element 14 of the holder has a shoulder 16 engaging the lower side of distribution plate 10. Below the shoulder 16, each element 14 has a downwardly tapering outer wall 17 forming a camming surface for a purpose to be described presently.

The upper portion of holder 12 is externally threaded as shown at 18. The shoulders 16 of the expansible lower end portion of the holder are clamped against the lower side of plate 10 by clamping means in the form of a nut 20 coacting with the threads 18 at the upper side of the plate. Nut 20 is screwed tightly against the upper side of plate 10, a washer 21 and gasket 22 being interposed between the nut and plate.

Figure 3:
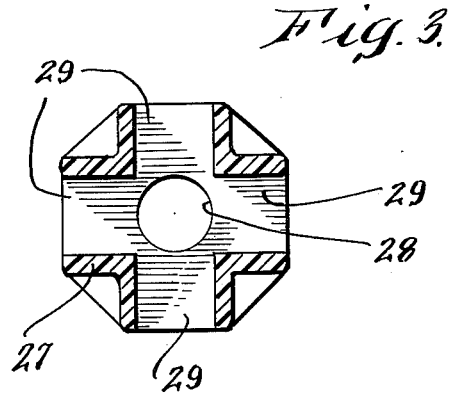
FIG. 3 is a sectional view on line 3–3 in FIG. 2.

A nozzle 24 has an externally threaded portion 25 screwed into the passage 13 of holder 12 and also has a lower portion 26 protruding from the lower end of holder 12. At its upper end, the nozzle is provided with a head 27 having an enlarged cap portion 27a. The nozzle passage 28 extends from the lower end of the nozzle and opens at its upper end into the head 27, which is provided with two lateral outlets 29 below the cap 27a (FIG. 3). The nozzle is adjustable vertically by rotating it in holder 12. Threaded on the upper portion of the nozzle is a nut 30 which clamps a gasket 31 against the upper end of holder 12.

To install the nozzle assembly, the expansible end portion 14 of holder 12 is first pushed downward through the hole 11 in plate 10. This is accomplished by forcing the flexible elements 14 together and thereby contracting the holder's lower end portion so that it will fit into hole 11. This contraction is facilitated by the camming action of the tapered surfaces 17 on the upper edge of hole 11 as the holder is forced downward into the hole. This insertion of the holder through hole 11 is effected with the nozzle 24 removed from the holder and with the nut 20 and the washer and gasket 21–22 mounted on the holder, the nut 20 being backed off from its clamping position. The nozzle 24 is then inserted into the holder 12 from above and screwed downwardly in the threaded passage 13. In this way, the nozzle forces the flexible elements 14 of the holder outwardly and thereby expands the lower end portion of the holder so that the shoulders 16 directly underlie the lower side of plate 10. The nut 20 is then screwed down to compress the gasket 22 against the upper side of plate 10 and clamp the shoulders 16 against the lower side of the plate. The holder 12 is thus firmly secured in the distribution plate and sealed around the opening 11. The nozzle can then be adjusted to its desired vertical position and secured in that position by nut 30, as previously described.

Figure 2:
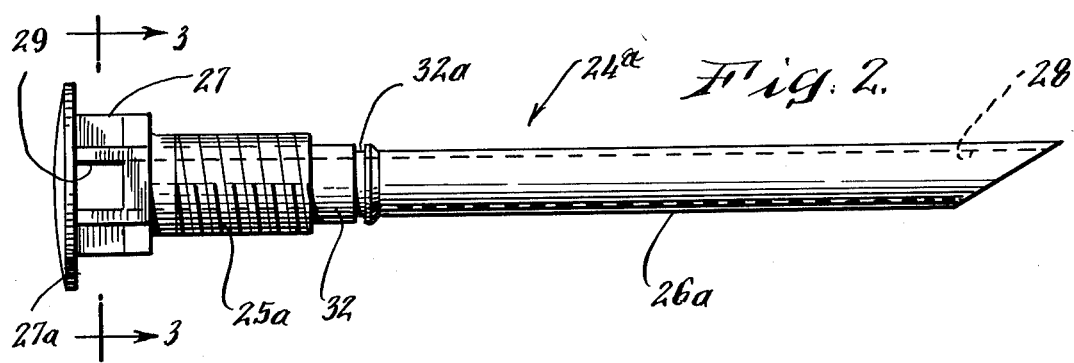
FIG. 2 is a side view of a modified form of the nozzle shown in FIG. 1.

The nozzle 24a shown in FIG. 2 has an externally threaded portion 25a which is substantially shorter than the externally threaded portion 25 in FIG. 1. Directly below the threaded portion 25a is a smooth cylindrical portion 32 having a diameter less than that of the threaded portion but greater than that of the lower portion 26a. This intermediate portion 32 is provided with an annular groove 32a for receiving an O-ring (not shown) which is adapted to seal against a smooth counterbore of the nozzle holder shown in FIGS. 5–7.

Referring to FIG. 5, the preferred nozzle holder 12a comprises an internally threaded sleeve 13a which is essentially similar to the sleeve 13 (FIG. 1) except that sleeve 13a is provided with a flexible skirt 34 immediately below its externally threaded portion 18 and is fabricated so that its flexible elements 14a are normally contracted toward each other at their lower portions, whereby the part of the sleeve below the skirt 34 has a normal diameter slightly less than the diameter of plate hole 11. Thus, this lower part can easily be inserted into and through the plate hole 11, as shown in FIG. 6, and there is no need for initially contracting the lower part of the holder by a camming action or otherwise, as in the FIG. 1 embodiment.

Figures 6, 7:
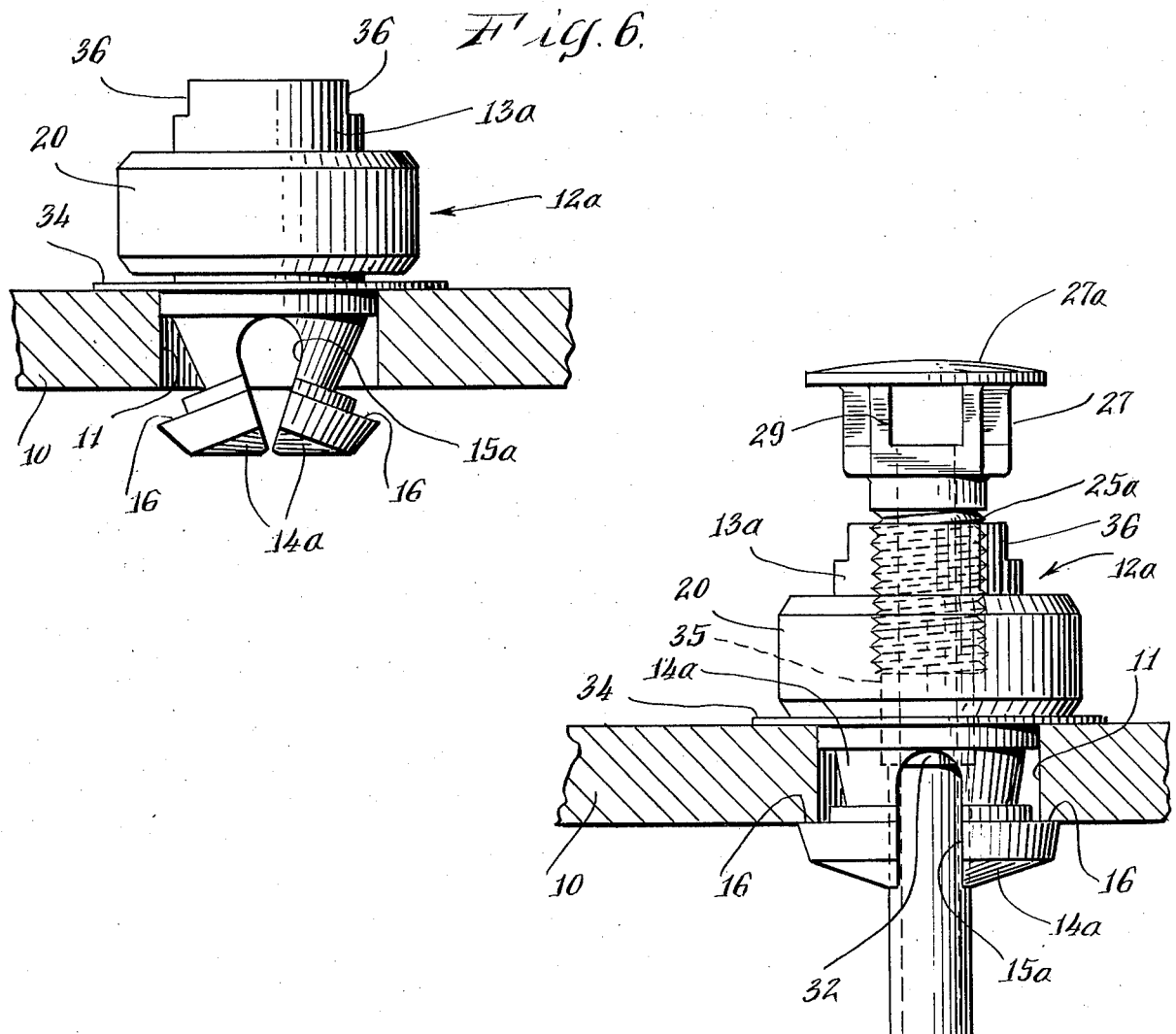
FIG. 6 is a side view of the preferred nozzle holder when first applied to the plate, the latter being shown in section.
FIG. 7 is a view similar to FIG. 6 but showing the nozzle holder and nozzle as finally assembled.

As shown in FIGS. 5 and 6, each vertical slot 15a is initially formed with a substantial width but acquires a narrow width at the bottom by displacing the flexible elements 14a toward each other at their lower ends and giving them a permanent set to retain them in this condition of reduced diameter slightly less than that of the plate hole.

With the parts positioned after the first assembly step as shown in FIG. 6, the normally retracted shoulders 16 are at a level below the bottom of plate 10, the flexible skirt 34 lies on the top of the plate, and the nut 20 is screwed on the holder's external threads 18 (FIG. 5) so that the nut is spaced slightly from the skirt 34.

In the second assembly step, the lower portion 26a of nozzle 24a (FIG. 2) is inserted into the upper portion of the holder sleeve 13a and is then forced downwardly through the sleeve by pressing down on the nozzle head 27. In this way, the flexible elements 14a of the nozzle holder are displaced outwardly and away from each other at their lower ends, whereby the shoulders 16 underlie the lower side of plate 10 around the hole 11 but are still located somewhat below the level of this lower side. The nozzle is pushed downward in the holder 12a until the nozzle's threaded portion 25a comes into contact with the upper end of the holder, at which time the nozzle's lower portion 26a protrudes substantially from the lower end of the holder.

To complete the assembly, the nut 20 is tightened down on the external threads of the holder 12a so as to engage the skirt 34 and then draw the holder upward relative to plate 10 until the shoulders 16 are clamped against the lower side of the plate, as shown in FIG. 7. The nozzle 24a is then screwed downward in holder 12a so that the O-ring (not shown) on the nozzle's intermediate portion 32 seals against the wall of the holder's smooth counterbore 35 (FIG. 7). This seal supplements the seal provided by the flexible skirt 34 which is compressed between nut 20 and the upper side of plate 34.

The nozzle 24a can be adjusted vertically in the final assembly by rotating the nozzle in the holder 12a. As shown, the upper portion of the holder is provided with opposed flats 36 for engagement by a suitable wrench (not shown), whereby rotation of the holder can be prevented during tightening of the nut 20 and during rotation of the nozzle.

I claim:

1. In combination with a plate having a hole for receiving a nozzle assembly, a nozzle holder extending through said hole and having a deformable end portion at one side of the plate, said end portion being adapted for passage through the hole to said one side of the plate, a nozzle extending through said holder and engaging said end portion internally to maintain the same in expanded condition for preventing withdrawal thereof through said hole, said nozzle having a central flow passage with an inlet at said one side of the plate and an outlet at the other side of the plate, the nozzle having a threaded connection with the holder to permit lengthwise adjustment of the nozzle in the holder, whereby the spacing of said passage outlet from the plate can be adjusted, clamping means coacting with the holder at said other side of the plate and including a nut threaded on the holder and tightened against said other side of the plate for clamping said expanded end portion against said one side of the plate, and means sealing said plate hole around the outside of the nozzle holder so that flow through said hole is confined to said nozzle passage.

2. The combination of claim 1, wherein the holder has a passage through which the nozzle extends, said end portion of the holder being slotted at spaced intervals around said passage to form a plurality of flexible elements which are held away from each other by the nozzle to maintain the end portion in said expanded condition.

3. The combination of claim 2, in which each of said flexible elements has a shoulder engaging said one side of the plate.

4. The combination of claim 1, in which said sealing means include a skirt located on the holder and held against said other side of the plate by the clamping means.

5. The combination of claim 1, in which said sealing means include a gasket interposed between the nut and said other side of the plate.

6. The combination of claim 1, in which said deformable end portion of the holder has a normal diameter not exceeding the diameter of the plate hole, whereby said end portion can be readily inserted into and through the plate hole.

7. The combination of claim 1, in which said deformable end portion of the holder has a normal diameter substantially greater than the diameter of the plate hole, said end portion being contractible for passage through the plate hole.

* * * * *